United States Patent
Massmann et al.

(10) Patent No.: US 10,788,196 B2
(45) Date of Patent: Sep. 29, 2020

(54) CONVERTER DEVICE AND IRRADIATION DEVICE HAVING SUCH A CONVERTER DEVICE

(71) Applicant: OSRAM GmbH, Munich (DE)

(72) Inventors: Frank Massmann, Wald (DE); Jens Richter, Deuerling (DE); Peter Vogt, Kelheim (DE); Jan Oliver Drumm, Regensburg (DE)

(73) Assignee: OSRAM Beteiligungsverwaltung GmbH, Grünwald (DE)

( * ) Notice: Subject to any disclaimer, the term of this patent is extended or adjusted under 35 U.S.C. 154(b) by 169 days.

(21) Appl. No.: 15/770,778

(22) PCT Filed: Oct. 4, 2016

(86) PCT No.: PCT/EP2016/073660
§ 371 (c)(1),
(2) Date: Apr. 25, 2018

(87) PCT Pub. No.: WO2017/071918
PCT Pub. Date: May 4, 2017

(65) Prior Publication Data
US 2018/0306425 A1    Oct. 25, 2018

(30) Foreign Application Priority Data
Oct. 26, 2015    (DE) .......... 10 2015 220 838

(51) Int. Cl.
*F21V 25/04* (2006.01)
*C09K 11/77* (2006.01)
(Continued)

(52) U.S. Cl.
CPC .......... *F21V 25/04* (2013.01); *C09K 11/7774* (2013.01); *F21S 41/16* (2018.01);
(Continued)

(58) Field of Classification Search
CPC .. F21V 25/04; F21V 25/02; F21V 9/30; F21S 45/70; F21S 41/16; F21S 41/14; C09K 11/7774; H05B 33/145
See application file for complete search history.

(56) References Cited

U.S. PATENT DOCUMENTS 4,890,037 A * 12/1989 Izawa ............... B60Q 1/14
315/77
2010/0072486 A1    3/2010 Offermans et al.
(Continued)

FOREIGN PATENT DOCUMENTS

| CN | 101414543 A | 4/2009 |
|---|---|---|
| CN | 101536197 A | 9/2009 |

(Continued)

OTHER PUBLICATIONS

Chinese Office Action based on corresponding Application No. 201680062804.1, dated Jul. 2, 2019 (6 pp).
(Continued)

*Primary Examiner* — David P Porta
*Assistant Examiner* — Meenakshi S Sahu

(57) ABSTRACT

According to the present disclosure, a converter device is provided. The device includes a phosphor element for converting a pump radiation into a conversion radiation and an excitation coil for producing an alternating magnetic field in which the phosphor element is arranged. The phosphor element has a conductor loop forming a coupling coil that is inductively coupled to the excitation coil such that the coupling coil and hence the phosphor element can be monitored by way of the inductive coupling.

19 Claims, 4 Drawing Sheets

(51) Int. Cl.
*H05B 33/14* (2006.01)
*F21S 41/16* (2018.01)
*F21V 9/30* (2018.01)
*F21V 25/02* (2006.01)
*F21S 45/70* (2018.01)
*F21S 41/14* (2018.01)

(52) U.S. Cl.
CPC ............... *F21S 45/70* (2018.01); *F21V 9/30* (2018.02); *F21V 25/02* (2013.01); *H05B 33/145* (2013.01); *F21S 41/14* (2018.01)

(56) References Cited

U.S. PATENT DOCUMENTS

2014/0009952 A1    1/2014  Nomura et al.
2015/0354761 A1*  12/2015  Nagao ................... F21S 41/16
                                                        362/510

FOREIGN PATENT DOCUMENTS

| CN | 102253113 A | 11/2011 |
| CN | 103411940 A | 11/2013 |
| CN | 104659640 A | 5/2015 |
| DE | 10327366 A1 | 9/2004 |
| EP | 0680120 A1 | 11/1995 |
| EP | 0953154 B1 | 9/2002 |
| JP | H06310781 A | 4/1994 |
| JP | 2010118267 A | 5/2010 |
| WO | 9832024 A1 | 7/1998 |
| WO | 2012124522 A1 | 9/2012 |

OTHER PUBLICATIONS

German Search Report based on application No. 10 2015 220 838.9 (7 pages) dated Jul. 12, 2016 (Reference Purpose Only).
International Search Report based on application No. PCT/EP2016/073660 (12 pages) dated Feb. 17, 2017 (Reference Purpose Only).

* cited by examiner

CONVERTER DEVICE AND IRRADIATION DEVICE HAVING SUCH A CONVERTER DEVICE

RELATED APPLICATIONS

The present application is a national stage entry according to 35 U.S.C. § 371 of PCT application No.: PCT/EP2016/073660 filed on Oct. 4, 2016, which claims priority from German application No.: 10 2015 220 838.9 filed on Oct. 26, 2015, and is incorporated herein by reference in its entirety.

TECHNICAL FIELD

The present disclosure relates to a converter device and irradiation device, having a phosphor element for converting a pump radiation emitted by a pump radiation source into conversion radiation.

BACKGROUND

By combining a pump radiation source with a high power density, for instance a laser, and a phosphor element arranged at a distance therefrom, said phosphor element emitting conversion radiation or conversion light upon excitation by the pump radiation, it is possible to realize light sources with a high luminance, for example. Here, the entire pump radiation may be converted in the phosphor element (full conversion), or else only a part thereof and the non-converted pump radiation may, proportionally, form an illumination light together with the conversion radiation.

Typically, the pump radiation is incident on the phosphor element in a focused form and substantially collimated, whereas the conversion radiation, as a rule, is output in a manner following Lambert's law. However, despite the beam-shaped incoming irradiation, the non-converted part of the pump radiation is also fanned-open in a manner comparable to the conversion radiation downstream of the phosphor element in the case of a partial conversion, for instance on account of scattering processes in the phosphor element.

SUMMARY

The present disclosure is based on the technical problem of specifying a particularly advantageous converter device and an irradiation device having such a converter device.

According to the present disclosure, this object is achieved by a converter device having a phosphor element for converting a pump radiation into conversion radiation and an excitation coil for producing an alternating magnetic field in which the phosphor element is arranged, wherein the phosphor element has a conductor loop forming a coupling coil that is inductively coupled to the excitation coil such that the coupling coil and hence the phosphor element can be monitored by way of the inductive coupling; and an irradiation device, having such a converter device and a pump radiation source for emitting the pump radiation.

Preferred embodiments are found in the dependent claims and in the entire disclosure, with a distinction not always being made in detail between device and method or use aspects in the illustration; in any case, the disclosure should be read implicitly in respect of all claim categories. Below, reference is predominantly made, for reasons of simplicity, to the "irradiation device"; however, the disclosure can likewise be read in relation to the converter device per se (without pump radiation source).

Presence and advantageously integrity, too, of the conductor loop (coupling coil) can be monitored by way of the inductive coupling of the conductor loop of the phosphor element with the excitation coil. Consequently, it is even possible, for example, to indirectly monitor whether the phosphor element overall is situated at its intended assembly place during the operation of the irradiation device. This is because, in the case of a fault, i.e. in the case of a missing or defective (see below) phosphor element, the focused or collimated pump radiation could propagate through a conversion radiation optical unit actually intended for leading away the conversion radiation. This could represent a significant source of danger for an observer and could be accompanied by damage to the retina, for instance, and, in the worst case, could have a loss of sight as a consequence. Therefore, the irradiation device is configured to at least reduce, advantageously completely prevent, the pump radiation ingress in the case of a fault, for example by switching the pump radiation source off.

Depending on the mode of operation, the phosphor element can be arranged, for example, on a carrier that is transmissive for the pump radiation (operation in transmission) or else on a carrier, for instance a metallic carrier, that predominantly serves for cooling (operation in reflection); the incoming radiation face for the pump radiation and the emission face for the conversion radiation lie opposite one another in the case of operation in transmission and they coincide in the case of operation in reflection. Here, the phosphor element can be directly applied on (directly adjoin) an appropriate carrier, for example, or it can be assembled by way of a connecting layer, for instance a joining layer.

Independently of the detailed type of assembly, a possible fault, in any case, may be that the phosphor element detaches from the carrier, as a result of which the just described problem of the pump radiation propagation could arise. However, the lack of the phosphor element with the conductor loop can be detected by way of the modified inductive coupling and the pump radiation source can be switched off ("safety shutdown"), for example.

Secondly, it is not necessarily only such a total failure that can be determined by way of the concept according to the present disclosure; instead, in an ideal case, it may also already be possible to capture a degradation of the conductor loop that accompanies a degradation of the phosphor element, i.e., for example, the start of the formation of a tear at the edge or centrally (from which a complete break with fragment formation may arise). This is because, for example, even a change in the ohmic resistance of the conductor loop, i.e., for example, an increase in the ohmic resistance, can influence inductive coupling (even before the conductor loop is completely interrupted, open load).

If a tear or break arises in the phosphor element, for example as a result of thermally induced stresses in the phosphor element that may arise, for instance, as a consequence of a temperature gradient during the irradiation by pump radiation or on account of temperature variations during the operation, the conductor loop may be completely severed in the process. Thus, no coupling coil is present anymore in that case; this is captured by a capturing apparatus as a corresponding change in the inductive coupling and this can then be implemented by a control unit to the extent of, for example, switching off the pump radiation source.

Therefore, the inductive coupling results in the alternating magnetic field produced by the excitation coil penetrating the coupling coil. For the purposes of producing the alternating magnetic field, the excitation coil is advantageously operated using an AC voltage source (generally e.g. with a fixed frequency, too; frequency modulation is preferred); for details, see below, also in respect of preferred operating parameters.

In a preferred configuration, the irradiation device is configured to capture the inductive coupling by way of a phase offset between the voltage and current in the excitation coil. Thus, an AC voltage, for example, is predetermined and the alternating current, and hence its phase offset in relation to the voltage, is measured. In general, current and voltage are phase offset in a coil, for instance by 90° in the case of an ideal (no-resistance) coil; on account of the ohmic resistance of the excitation coil, the intrinsic phase offset thereof, i.e. the phase offset that is independent of the inductive coupling, is then slightly reduced, for example.

The presence of the coupling coil and hence the inductive coupling takes the phase offset to a value which then characterizes the normal state of "present/intact phosphor element". This value can be ascertained, for example by measurement, within the scope of a calibration (for each irradiation device or, advantageously, for a respective type, optionally taking account of a batch-to-batch variation). A fault can then be captured by way of a corresponding change in the phase offset, for instance a change back to the intrinsic phase offset in the case of total failure; on the other hand, however, it is also possible to capture a gradual change, for example, and hence a degradation. In summary, the irradiation device is advantageously configured to capture the change in the inductive coupling by way of a change in the phase offset.

In general, the irradiation device "being configured" means that the latter is equipped with an appropriate means, for instance a capturing means, for example a current measuring device in the case of a phase offset, or an operating means in the case of the excitation coil, for instance an AC voltage source. In addition to the actual capturing/operating means, a certain logic is advantageously also always co-integrated, for instance a control unit, which then operates the operating means appropriately, and/or an evaluation unit, which evaluates the data ascertained by the capturing unit, for instance among themselves and/or with reference data. Further, provision may also be made of a memory unit, for example, in which e.g. the last captured data may be saved such that, for example in the case of a fault, it is possible to track the development of the damage after a disassembly from the irradiation device. A pure analog capture is also possible, for instance by way of mixing with subsequent filtering; a DC value ascertained thus may be compared to a reference value ascertained previously in a calibration, for example.

In general, the inductive coupling could also be monitored by, for example, a separate capturing means for capturing a magnetic field, for instance a Hall sensor. However, capturing the phase offset may help reduce the number of individual parts and components, for example, and may thus facilitate a compact and robust solution, for example, and, on account of the multiple use of the excitation coil, it may offer cost advantages as well.

In general, the inductive coupling can be described to the effect of the varying magnetic flux through the coupling coil inducing a current in the latter, said current counteracting its cause, i.e. locally reducing the magnetic field of the excitation coil. In view of the excitation coil, this may be described as a reduced self-inductance; analytically, it is possible to describe the interaction using a differential equation, for example, where the first order term reproduces the self-inductance and the second order term reproduces the interaction between the coils.

In a preferred configuration, the irradiation device is configured for an excitation of the excitation coil and hence for a production of the alternating magnetic field with a frequency of at least 100 MHz, advantageously at least 200 MHz, 300 MHz, 400 MHz and 500 MHz, with preference increasing along this sequence; by way of example, possible upper limits may be, with increasing preference along the sequence as specified, at most 5 GHz, 4 GHz, 3 GHz, 2 GHz and 1 GHz, wherein the provision of an upper limit generally may also be of interest independently of a lower limit, and vice versa. By way of example, a lower limit may be of interest on account of a phase offset that increases with the excitation frequency (cf. FIG. 2 for illustrative purposes), whereas upper limits may emerge e.g. from a practical implementation, for instance on account of an increasing outlay when capturing the phase offset (even if this is larger) at very high frequencies (GHz range).

In a preferred configuration, the irradiation device is configured to produce the alternating magnetic field with a varying frequency. During a respective measuring phase, i.e. when the inductive coupling is captured, the alternating magnetic field is then produced at different frequencies. Here, it is possible to predetermine different discrete frequency values, for example, or the frequency may also be varied continuously over a frequency range (frequency sweep, called chirp in the preferred linear case). Such a frequency range may extend over e.g. at least 100 MHz, advantageously at least 200 MHz and (independently thereof) over no more than e.g. 1.5 GHz, advantageously no more than 1 GHz, particularly advantageously no more than 700 MHz.

Advantageously, a frequency range of the discrete change or of the frequency sweep lies completely within an interval made concrete above by way of the upper and lower limits of the frequency (100 MHz to 5 GHz, advantageously restricted according to the specifications made above), wherein interval and range boundaries may also coincide. In general, the excitation with different frequencies may be advantageous, for example, to the extent that a phase offset caused by the ohmic resistance of the excitation coil can differ from a phase offset caused by the coupling in terms of the frequency dependence.

In a preferred configuration, the conductor loop of the phosphor element is self-contained, i.e. on or within the phosphor element. Then, the conductor loop can advantageously be provided from the same material throughout. However, in general, a non-self-contained, interrupted conductor loop, for example, would also be conceivable, the latter then being able to be contacted, for example, from outside of the phosphor element by way of two pick-offs, for instance two bond wires; then, the inductive coupling could also be captured by way of, for example, the current induced in the coupling coil using a current measuring device next to the phosphor element.

However, the preferred conductor loop is self-contained and the phosphor element is without such pick-offs, i.e. it is electrically insulated from the remaining irradiation device (and hence not connected in an electrically conductive manner) in this respect. The self-contained coil may be advantageous, for example in respect of a simplified and robust construction, because additional connecting points (such as e.g. in the case of the bond wires) tend also to increase the risk of a failure. Moreover, the process of connection per se, i.e. precisely this bonding, for example, may already constitute a mechanical load on the phosphor element and introduce preliminary damage.

In general, it is also conceivable to use the inductive coupling to the extent of addressing an analog/digital component on the phosphor element thereby, said component then being able, in turn, to transfer information about the phosphor element by way of the inductive coupling. Advantageously, the phosphor element is without analog/digital components; particularly advantageously, it only has the conductor loop in addition to the phosphor and, optionally, a matrix material for the latter. In general, the phosphor element may also have a plurality of conductor loops; advantageously, it has precisely one.

In a preferred configuration, the conductor loop is deposited on the phosphor element, advantageously by sputtering or thermal evaporation. The deposition can be effectuated on a negative mask (which is removed thereafter) and/or in combination with the subsequent laser ablation of non-required coating regions, for example; wet-chemical structuring after photolithographic masking is also possible. However, in general, a conductor loop formed into the phosphor element would also be conceivable, said loop thus being e.g. sintered-in in the case of a ceramic or melted-in as matrix material in the case of glass. In general, it is preferable for the conductor loop, or at least one turn thereof, to be exposed at a surface of the phosphor element.

In general, the phosphor element can be e.g. a matrix material, for instance glass, with a phosphor embedded therein, for instance in particle form. However, the phosphor element may also be constructed from the phosphor itself as a formative material, for instance in the case of agglomerated phosphor particles or a sintered phosphor ceramic. "Phosphor" can also be read in relation to a mixture of a plurality of individual phosphors but advantageously means a single phosphor.

Independently of the configuration of the phosphor element in detail, the conversion is advantageously a down conversion, i.e. higher energy radiation is converted into lower energy radiation. In general, the pump radiation can also be UV radiation, for example, with blue light being preferred; in general, the conversion radiation may also lie in the infrared range, with visible conversion light being preferred.

The phosphor element is advantageously flat, i.e. it has a smaller extent in a thickness direction than in each surface direction perpendicular thereto; by way of example, the extent in the thickness direction can be at most ½, ⅓, ¼ or ⅕ of the extent in each of the surface directions, while possible lower limits may be, for example, at least ¹⁄₂₀₀, ¹⁄₁₀₀ or ¹⁄₅₀.

The incoming radiation face for the pump radiation and the emission face for the conversion radiation advantageously extend in the surface directions in each case and are particularly advantageously planar in each case; during operation in transmission, the incoming radiation and emission faces lie opposite one another in relation to the thickness direction. Independently of the configuration of the phosphor element in detail, the conductor loop is a part thereof. By way of example, it may be arranged on the incoming radiation or the emission face (transmission operation) or it may be arranged on the common incoming radiation/emission face or the opposite face (reflection operation); advantageously, operation is in transmission and the conductor loop is arranged on the emission face. The excitation coil may likewise be arranged on the one side or the other side of the phosphor element; in the case of operation in transmission, it is advantageously assigned to the emission face.

In a preferred embodiment, the conductor loop has a plurality of turns N, for example at least 2 turns, advantageously at least 3 turns, with possible upper limits possibly being, for example, a maximum of 10, 8 or 6 turns (independently thereof). The inductance of the coupling coil and hence the inductive coupling can be amplified by the number of turns N. In general, a coil with a plurality of turns can also be constructed as a flat coil, for example, i.e. the windings can extend in a spiral fashion in a plane.

However, in view of a radial, compact design, the form of a cylinder coil may be advantageous. Advantageously, the plurality of turns N are deposited in a corresponding plurality of planes, that is to say each turn in a dedicated plane; then, a dielectric, such as e.g. silicon dioxide or silicon nitride, can be deposited in each case between the planes, with the individual planes then being interconnected by way of vias.

In a preferred embodiment, the conductor loop is provided from indium tin oxide (ITO), which is advantageously deposited by sputtering or thermal evaporation and which can optionally be formed by subsequent laser ablation (or structuring by means of wet chemical processes after preceding masking by means of lithography) of unrequired coating regions. By way of example, ITO can be advantageous to the effect that the conductor loop made therefrom may be comparatively transmissive, for instance in comparison with e.g. a metal. This opens up design possibilities, for example in respect of a surface covering degree in general or else in relation to the guidance of the conductor loop.

In general, very different shapes are conceivable for a conductor loop arranged on the incoming radiation or emission face (the following relates to a viewing direction perpendicular to the face having the conductor loop): by way of example, the conductor loop can be round, for instance ellipsoidal or advantageously circular; thus, it may have e.g. a circular ring shape. However, polygonal shapes or combinations of polygonal and round shapes are also possible in general; by way of example, the conductor loop thus can have a rectangular outer shape in conjunction with a round (or circular) inner shape.

For instance, in view of a tear identification that is as comprehensive as possible, a conductor loop extending in a meandering form may be advantageous; the individual loops of the meandering form may then extend, for example, transversely over the incoming radiation or emission face. In general, all these forms may also be of interest expressly in the case of a conductor loop that is not provided from ITO, i.e., for example, in the case of a conductor loop made of metal. The latter may be preferred in general, with the metal then further advantageously having aluminum, i.e. being able to be an aluminum alloy such as AlCu, for example.

By way of example, a conductor track (for instance made of metal or ITO) forming the conductor loop may have a conductor track width as measured perpendicular to its longitudinal extent (in the surface directions) of at least 10 μm and, with increasing preference along the following sequence, a conductor track width of at least 20 μm, 30 μm, 40 μm or 50 μm, wherein, independently thereof, upper limits may be 200 μm, 150 μm or 100 μm, for example. Over its longitudinal extent, the conductor loop need not necessarily have a constant width, and so the specifications just made above relate, in general, to a mean width formed over its longitudinal extent; nonetheless, a constant width is preferred.

In relation to mean extent x of the phosphor element in the surface directions, i.e. the mean value of the smallest and greatest extent, a width of the conductor track forming the conductor loop may be, for example, at least 1/100 x, advantageously at least 1/80 x and, for example, at most 1/10 x, advantageously 1/20 x, independently thereof.

In a preferred embodiment, the conductor loop has a fractal shape; i.e., it is constructed to a certain extent from a plurality of reduced copies of itself (self-similar structures). The number of levels of the self-similar structures may be e.g. at least 2, advantageously at least 3, more advantageously at least 4 and (independently thereof) e.g. at most 30, 20 or 10. The fractal shape may offer advantages in respect of capturing the area, for example; advantageously, it is realized using a conductor loop made of ITO (however, in general, a metal is also conceivable, for example). A Koch curve is preferred as a fractal shape; the conductor loop particularly advantageously has the shape of a Koch snowflake. By way of example, a conductor loop forming a Sierpinski area, in particular a Sierpinski triangle, is also possible.

In a preferred embodiment, the conductor loop is provided from a metal and, if it satisfies a stop function, it thus delimits the extent of a beam path with conversion radiation led away by way of a conversion radiation optical unit (illumination optical unit). Thus, the conductor loop can advantageously be used in two different ways, namely for monitoring the integrity/presence of the phosphor element and, at the same time, for forming the beam within the meaning of beam masking in the style of a stop. Here, a self-contained conductor loop may be particularly advantageous (see above) because this may, for example, facilitate symmetric beam forming. The conductor loop advantageously forms a pinhole stop with a circular aperture; a circular-ring-shaped conductor loop is particularly preferred.

A preferred embodiment relates to an advantageous relative arrangement of the excitation and coupling coils in respect of their tilt in relation to one another. The excitation coil lies in an excitation coil plane and the coupling coil lies in a coupling coil plane; here, the central axis of the respective coil is perpendicular to the respective plane and the respective plane intersects the respective coil centrally in respect of the extent of the latter along the central axis (a respective coil advantageously has at least rotary symmetry or it is advantageously rotationally symmetric with respect to the central axis). Advantageously, the excitation coil plane and the coupling coil plane are tilted in relation to one another by no more than 30° and, with increasing preference along this sequence, by no more than 25°, 20°, 15°, 10° or 5°; particularly advantageously, they are parallel to one another, which may be advantageous in respect of, for example, inductive coupling that is as pronounced as possible.

As taken along the central axes that are advantageously lying parallel to one another, a relatively small distance between the coils is preferred; by way of example, excitation coil plane and coupling coil plane may be spaced apart by at most 0.8 times, 0.6 times, 0.4 times or 0.2 times (with increasing preference along the specified sequence) the effective cross section of the coupling coil (they may also coincide; on the other hand, a possible lower bound may also, however, be 0.1 times).

In a preferred embodiment, the excitation coil has an effective cross section that is at most 2 times greater than the coupling coil and, with increasing preference along the following sequence, an effective cross section that is at most 1.8 times, 1.6 times, 1.4 times or 1.2 times greater than the coupling coil. For each coil, the mean value of smallest and largest extent of the cross-sectional area (taken perpendicular to the central axis) of the respective coil, i.e. the area enclosed thereby, is taken to be the "effective cross section". In the preferred circular ring-shaped conductor loop, the effective cross section then corresponds to, for example, the circle diameter (the internal diameter). The excitation coil advantageously likewise has a circular cross-sectional area.

In a preferred embodiment, the coupling coil has an inductance of at least 150 pH and, with increasing preference along the following sequence, an inductance of at least 500 pH, 750 pH or 1 nH, with possible upper limits (independently thereof) possibly being e.g. at most 150 nH or 50 nH or 10 nH. A corresponding inductance of the coupling loop may help increase the inductive coupling and hence, for example, the above-described change in the phase offset between the voltage and current in the excitation coil.

In a preferred configuration, the conductor loop of the phosphor element has an ohmic resistance of at most 20Ω and, with increasing preference along the following sequence, an ohmic resistance of at most 18 Ω, 16 Ω, 14 Ω, 12 Ω, 10 Ω, 9 Ω, 8 Ω, 7 Ω, 6 Ω, 5 Ω, 4 Ω, 3Ω or 2Ω; possible lower bounds may, for technical reasons, be e.g. at least 1 mΩ, 10 mΩ or 100 mΩ. With a corresponding ohmic resistance that is as small as possible, it is possible to increase the inductive coupling; cf., FIG. 3 for illustration purposes.

As already mentioned at the outset, the irradiation device is configured, in a preferred configuration, to at least reduce a mean output power of the pump radiation source, which may also be operated in e.g. pulsed fashion, in the case of a fault that is captured by way of the inductive coupling (cf., in this respect, the disclosure above in detail); advantageously, the pump radiation source is completely switched off.

The present disclosure also relates to an irradiation device having an above-described converter device and a pump radiation source for emitting the pump radiation. Here, the pump radiation source and converter device are arranged relative to one another in such a way that, during normal operation (no fault), the pump radiation is incident on the phosphor element which, following this excitation, emits the conversion radiation.

The present disclosure also relates to a method for producing an irradiation device as disclosed in the present case and, in this respect, reference is also expressly made to the above disclosure and to the method features implicitly or explicitly contained therein. In a preferred production method, the inductive coupling between excitation coil and coupling coil is measured at different known temperature values for the purposes of calibrating the irradiation device; thus, it is possible, for example, to set predefined temperatures in a furnace and/or it is possible to measure the temperature of the phosphor element, for instance using a thermal element, during a heating profile. Advantageously, the calibration is carried out when the pump radiation source is switched off. Advantageously, the calibration is carried out over a temperature interval that covers a range of e.g. up to at least 120° C.; further possible upper limits may be, for example, 140° C., 160° C., 180° C., 200° C. or 220° C. By way of example, a lower limit may be at most −30° C.

A temperature dependence ascertained within the scope of the calibration can be stored in an evaluation unit, for example for comparison with the data ascertained during operation by way of a capturing unit. Here, the temperature of the phosphor element may be e.g. measured directly or else ascertained by calculation, for instance from the switch-on duration of the pump radiation source, optionally in conjunction with an ambient temperature (which, as a rule, is measured in any case, for example in the automotive field).

The present disclosure also relates to the use of an irradiation device, as disclosed in the present case, for illumination purposes, with the presence of the coupling coil and hence, for example, the integrity of the phosphor element or the presence thereof being monitored. Advantageously, this monitoring is effectuated during the operation of the irradiation device, i.e. while the latter emits conversion radiation; monitoring may be effectuated e.g. continuously or else in cycles during measurement phases such that the inductive coupling is therefore not measured continuously but at intervals.

The use of the irradiation device, as disclosed in the present case, for motor vehicle lighting, more advantageously for motor vehicle external lighting, particularly advantageously in a front headlamp, for instance of an automobile, is preferred. However, an application in the tail lamps/signaling lamps, for example, may also be of interest, particularly in the brake lights; an application in the vehicle interior is also conceivable.

Particularly in the automotive field, but also in general, the irradiation device according to the present disclosure is advantageously shielded electromagnetically to the outside; this should be read both in relation to the apparatus per se and the corresponding use. Thus, it is possible, for example, to prevent an unwanted interaction with other assemblies.

The present disclosure also facilitates heating of the coupling coil, and hence also of the phosphor element overall, by induction of a magnetic flux in said coupling coil provided on the phosphor element. Consequently, it is possible to pre-heat the phosphor element, especially at low temperatures; this may help reduce mechanical stresses which could otherwise occur in the case of a pulse-shaped irradiation of the phosphor element with excitation laser radiation. By way of example, the phosphor element can be heated by at least 5° C., advantageously at least 10° C. or 15° C. (possible upper limits may be 100° C. or 50° C.).

BRIEF DESCRIPTION OF THE DRAWINGS

Below, the present disclosure will be explained in more detail on the basis of exemplary embodiments, wherein the individual features within the scope of the coordinate claims may also be essential to the present disclosure in other combinations and wherein still no distinction is made in detail between the various claim categories.

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
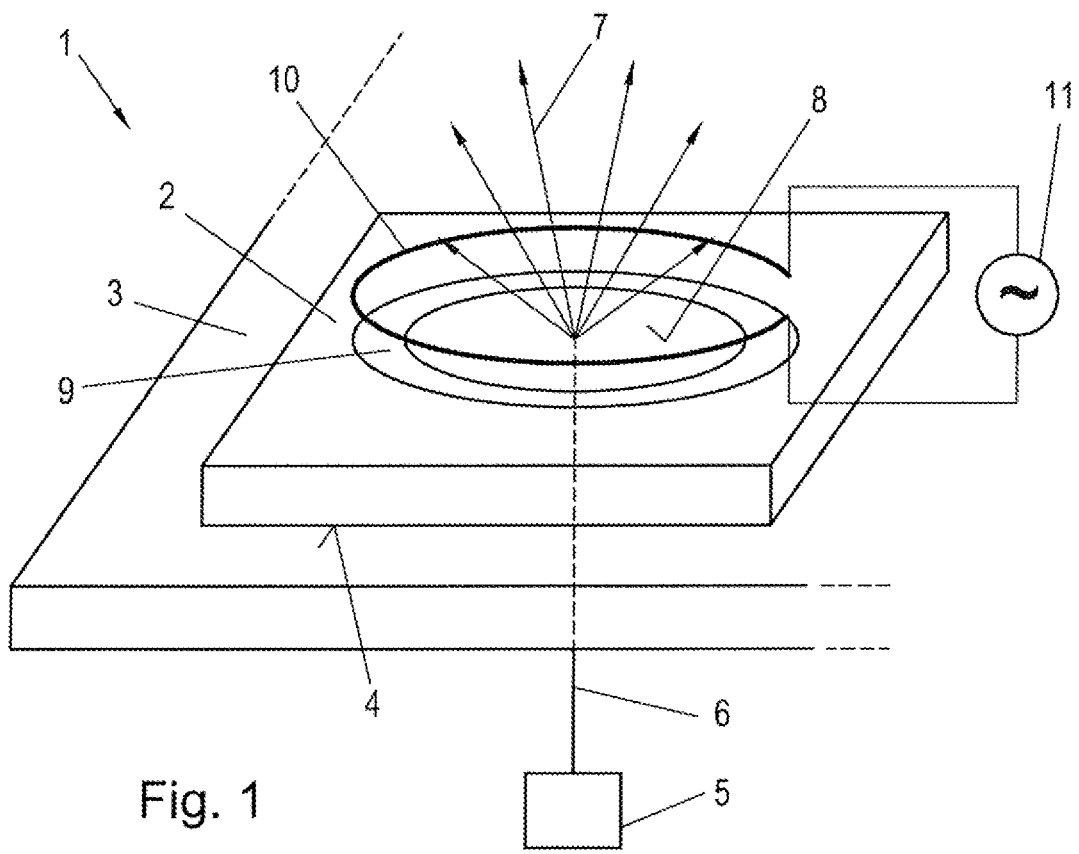
FIG. 1 shows, in an oblique view, a schematic illustration of an irradiation device according to the present disclosure, having an excitation coil and a phosphor element with a coupling coil.

FIG. 1 shows, in an oblique view, a schematic illustration of an irradiation device 1 according to the present disclosure with a phosphor element 2. The phosphor element 2 is assembled on a carrier 3 made of sapphire and it is irradiated at an incoming radiation face 4, lying at the bottom in the figure, with pump radiation 6, blue laser light in the present case, that is emitted by a pump radiation source 5. The pump radiation 6 passes through the carrier 3 and it is incident on the incoming radiation face 4.

Conversion radiation 7, yellow light in the present case, that is emitted following the excitation with the pump radiation 6 is, in principle, emitted in omnidirectional fashion, i.e. not only at an emission face 8 but also at the opposite incoming radiation face 4. On the latter side or on a side of the carrier 3 facing away from the phosphor element 2, provision can therefore be made of a dichroic coating that reflects the conversion radiation 7 but transmits the pump radiation 6 in order to increase the portion of the conversion radiation emitted to the front (to the top in the figure). This is not illustrated in detail for reasons of clarity.

Likewise, for reasons of clarity, a conversion radiation optical unit provided for leading away the conversion radiation from the emission face 8 has not been illustrated, said conversion radiation optical unit collimating the conversion radiation 7 output in Lambert-form (and possibly being imaging or non-imaging). Part of the phosphor element 2, which is constructed from a cerium-doped, sintered yttrium-aluminum-garnet ceramic in the present case, is a conductor loop 9 made of an aluminum alloy (AlCu) that has been deposited on the ceramic. The conductor loop 9 is self-contained and forms a coupling coil which is passive per se.

For excitation purposes, the irradiation device 1 has an excitation coil 10, which is fed by an AC voltage source 11. An alternating magnetic field is produced by means of the excitation coil 10, said magnetic field in any case partly penetrating the coupling coil, i.e. the conductor loop 9. This alternating magnetic field induces in the coupling coil an alternating current respectively counteracting its cause; see also, in detail, the presentation in the introductory part of the description. The excitation coil 10 and the coupling coil are inductively coupled, as a result of which it is possible to monitor the presence, and also the integrity, of the latter.

Thus, a canceled inductive coupling may indicate a fault, for example a phosphor element 2 that has detached from the carrier 3 and fallen down, or a phosphor element 2 that is penetrated by a tear. In such a fault, the collimated pump radiation 6 would then propagate into the conversion radiation optical unit actually provided for leading away the conversion radiation 7, and hence it would propagate to an illumination application, constituting a significant source of danger. Therefore, the pump radiation source 5 is switched off if a fault is determined by way of the inductive coupling.

For the purposes of capturing the inductive coupling, the phase offset between the voltage and current is measured in the excitation coil 10, said phase offset lying at 90° in the case of an ideal coil without an inherent ohmic resistance, parasitic capacitances and without inductive coupling. Since the excitation coil in turn has a certain ohmic resistance, its intrinsic phase offset is slightly reduced; it is further reduced in the presence of the coupling coil, to be precise to a value that characterizes the normal case (present or intact coupling loop 9). In the case of a fault (see above), i.e. if the inductive coupling is canceled, the phase offset then increases in the excitation coil 10; this can be captured by a current measuring device (not illustrated) and may be converted into a switch-off of the pump radiation source 5 by way of an evaluation/control unit.

FIGS. 2 to 5 now respectively show the dependence of the relative phase offset between the voltage and current in the excitation coil 10, depending on different influencing variables; here, the relative phase offset is the difference between the phase offset in the case of an intact/present conductor loop 9 (normal operation) and the intrinsic phase offset (fault). By way of example, a larger relative phase offset may offer advantages from a measurement point of view.

Figure 2:
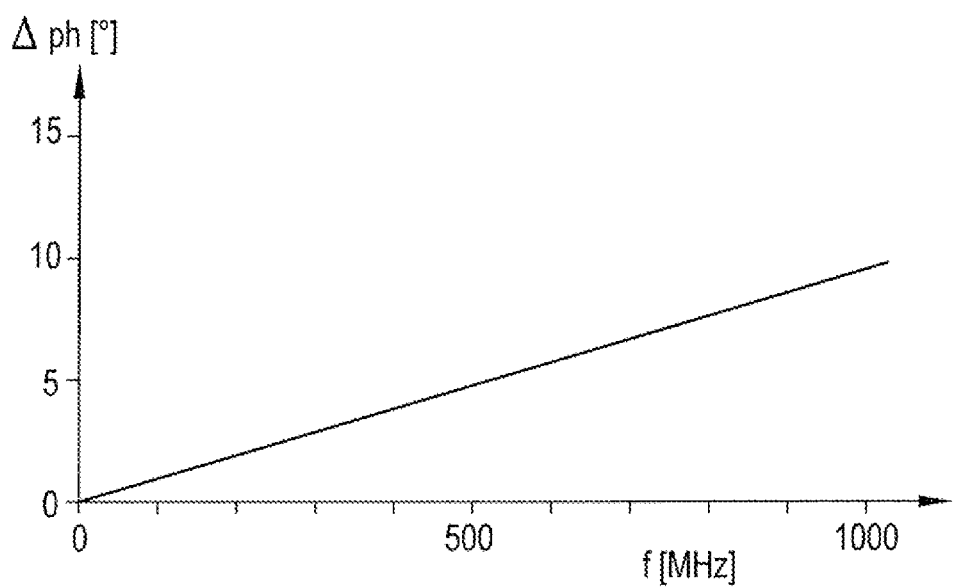
FIG. 2 shows the absolute value of the relative phase offset between the voltage and current in the excitation coil of the irradiation device according to FIG. 1, depending on the excitation frequency.

FIG. 2 illustrates the dependence of the relative phase offset on the excitation frequency f of the AC voltage source 11. The relative phase offset increases with the excitation frequency f, from approximately 1° at 100 MHz to just under 10° at 1 GHz. Despite there being an increasing relative phase offset, the capture thereof may be complicated from a measurement point of view in the case of significantly higher frequencies.

Figure 3:
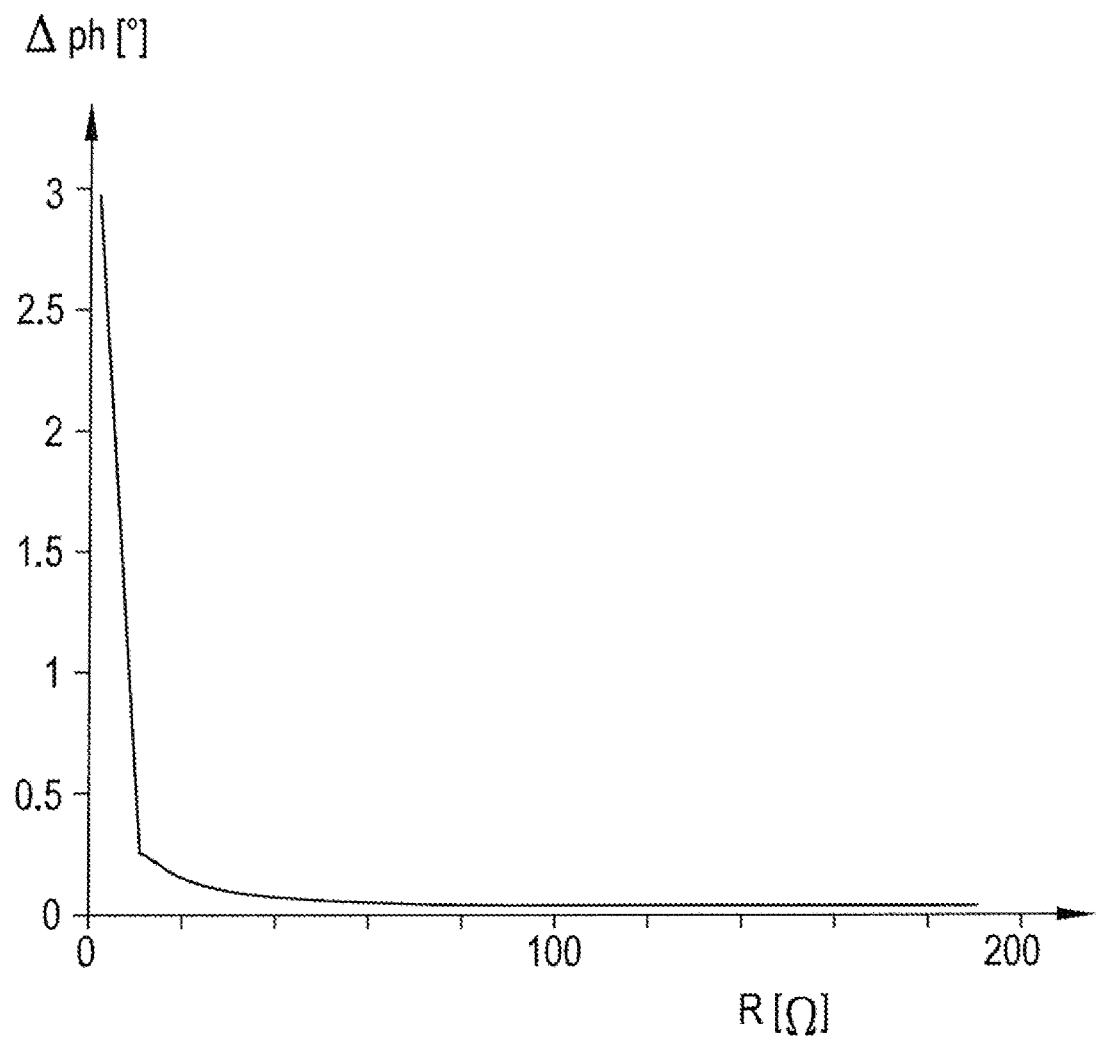
FIG. 3 shows the absolute value of the relative phase offset between the voltage and current in the excitation coil of the irradiation device according to FIG. 1, depending on the ohmic resistance of the coupling coil at a predetermined excitation frequency.

FIG. 3 shows the dependence of the relative phase offset on the ohmic resistance R of the conductor loop 9, i.e. the coupling coil. Here, a significant increase can be seen at resistance values of under 10Ω; a correspondingly small resistance is advantageous.

Figure 4:
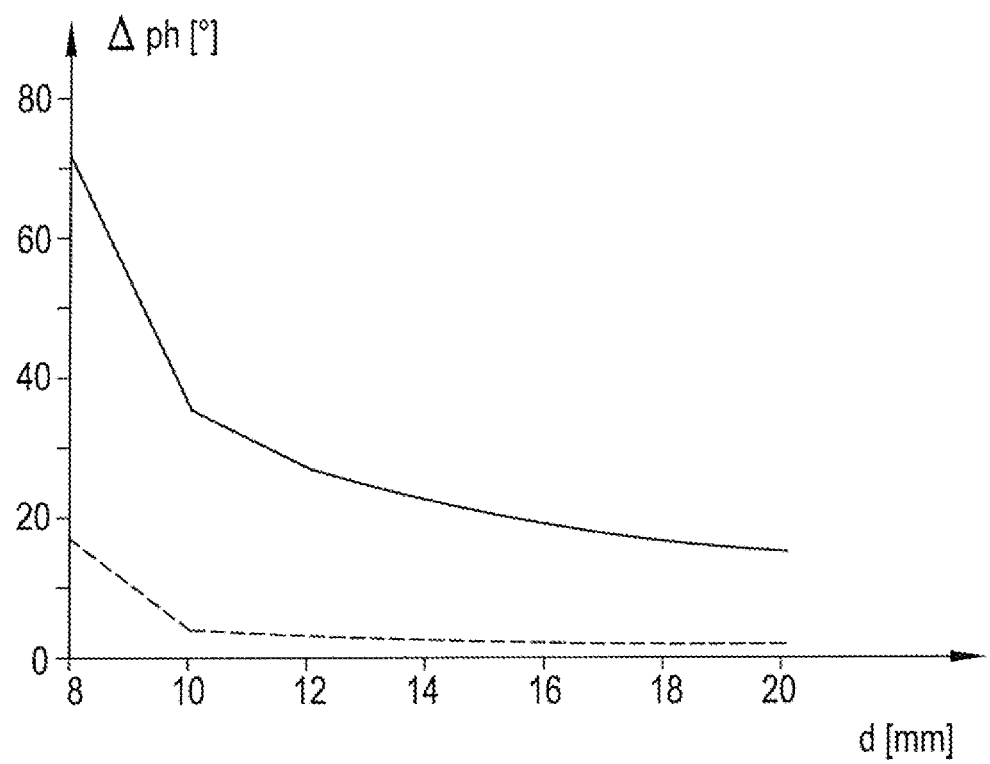
FIG. 4 shows the absolute value of the relative phase offset between the voltage and current in the excitation coil of the irradiation device according to FIG. 1, depending on the effective cross section of the coupling coil and compared to a coupling coil with a different turn number N.

FIG. 4 initially shows the relative phase offset depending on the effective cross section d, in the present case the diameter of the circular cross-sectional area of the coupling coil, to be precise for a coupling coil with one turn (dashed curve) in comparison with a coupling coil with ten turns (solid curve). Independently of the number of turns, the relative phase offset increases with decreasing cross section d (in the limit case, the cross sections of coupling and excitation coil correspond). Further, it can be seen from the diagram that the relative phase offset may also be increased by increasing the number of turns N; the relative phase offset increases with the inductance of the coupling coil.

Figure 5:
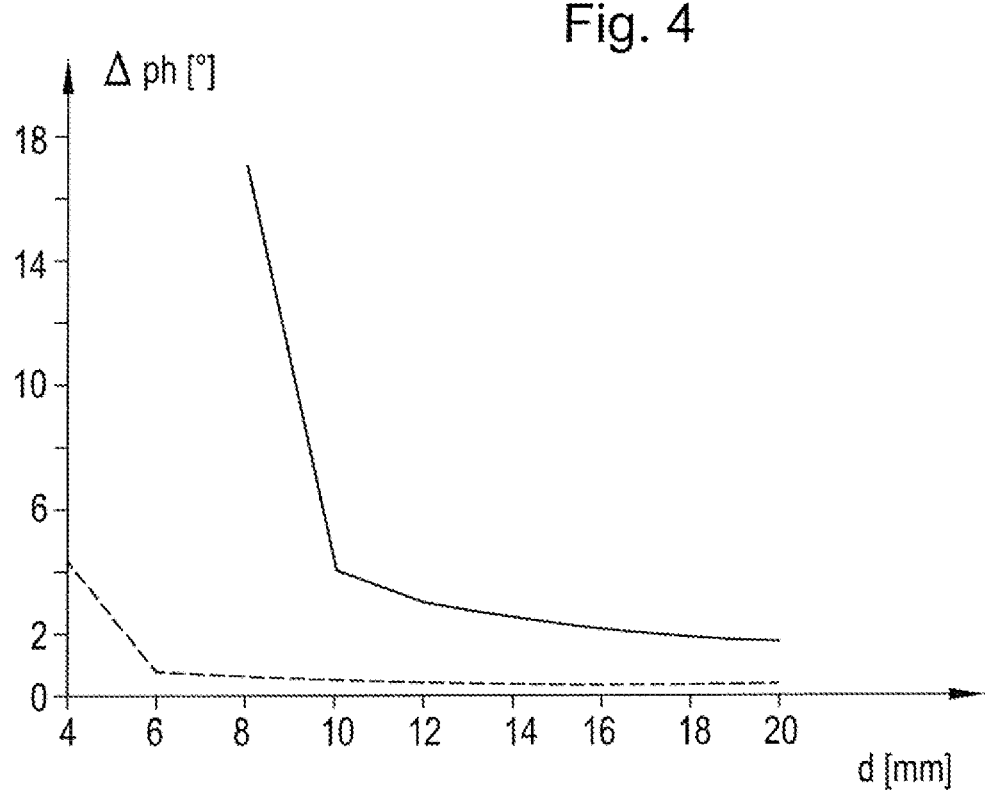
FIG. 5 shows the absolute value of the relative phase offset between the voltage and current in the excitation coil of the irradiation device according to FIG. 1, depending on the effective cross section of the excitation coil (for two different cross sections of the coupling coil)

FIG. 5 shows the relative phase offset depending on the effective cross section d of the excitation coil 10, which corresponds to the diameter thereof. Here, two graphs are plotted, namely for two different cross sections of the coupling coil ($d_{coupling}$=2 mm according to the dashed curve and $d_{coupling}$=4 mm according to the solid curve). Both curves show that the relative phase offset is at a maximum when the cross section d of the excitation coil 10 approaches the cross section $d_{coupling}$ of the coupling coil. For the purposes of maximizing the inductive coupling, the two coils are therefore ideally made with cross sections that lie as close together as possible.

Figure 6:
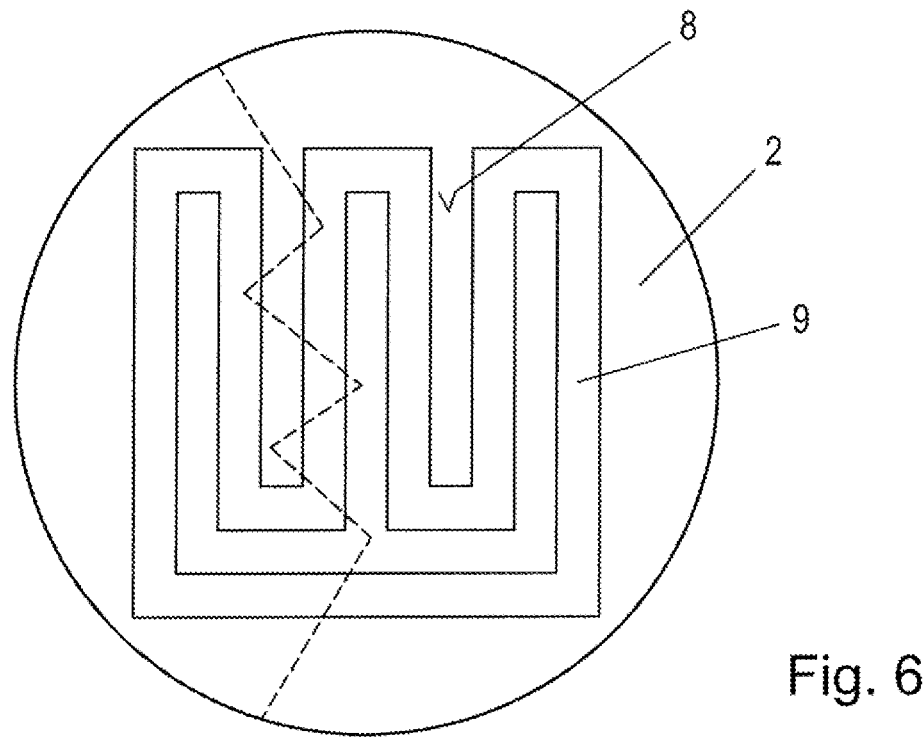
FIG. 6 shows an alternative phosphor element having a coupling coil that is provided in a meandering manner.

FIG. 6 shows, in a plan view looking at the emission face 8, an alternative phosphor element 2. In this case, the conductor loop 9 is not made of an aluminum alloy but from indium tin oxide (ITO) that is comparatively transmissive for the conversion radiation. Therefore, the conductor loop 9 may also be guided transversely over the emission surface 8, namely in a meandering manner in the present case, without a significant impairment of the emission properties of the phosphor element 2.

FIG. 6 schematically indicates (by way of a dashed line) a tear extending transversely through the phosphor element 2. If an untypical tear initiation or a partial central ablation is assumed, the meandering conductor loop 9 allows this damage to be detected not only in the sketched-out situation (complete tear propagation) but also already in an initial stage, for example when the central loop of the meandering form is severed.

Figure 7:
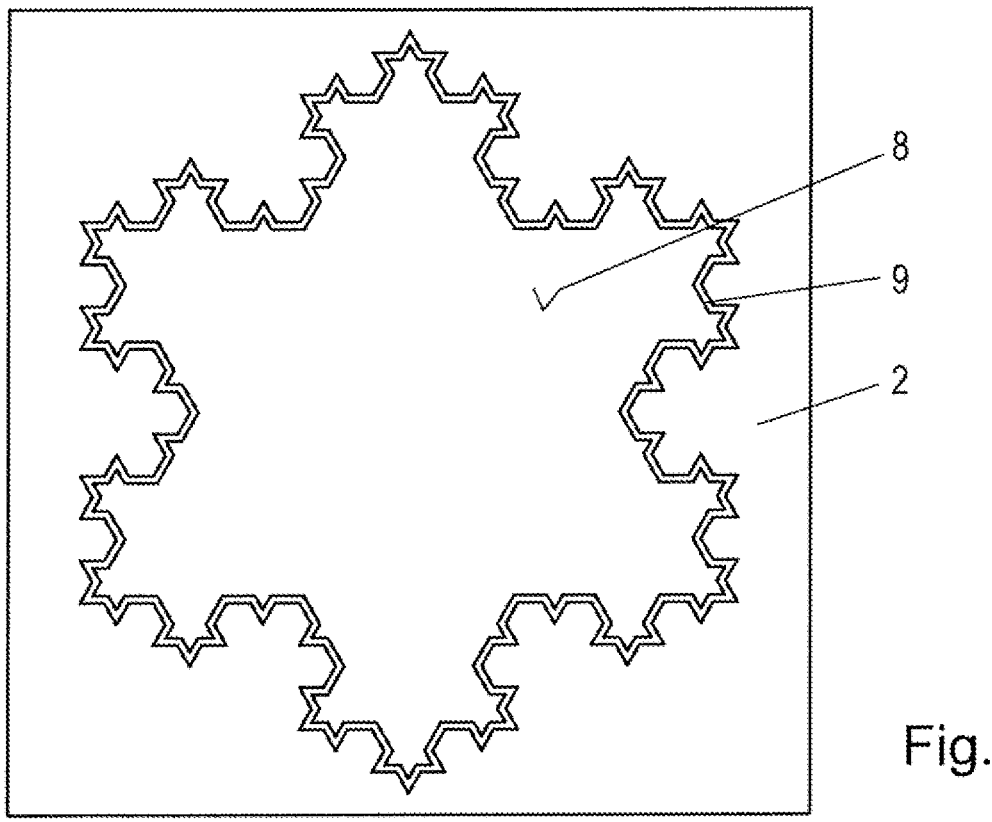
FIG. 7 shows a further alternative phosphor element having a coupling coil with a fractal form.

FIG. 7 shows a further phosphor element 2, likewise when looking on the emission surface 8 in a plan view. In this case, too, the conductor loop 9 is provided from ITO, but it does not extend in a meandering manner but in the form of a Koch snowflake. Using a conductor loop 9 formed in a fractal manner, it is possible, for example, to optimize the capture of the face.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A converter device, comprising
a phosphor element for converting a pump radiation into a conversion radiation and
an excitation coil for producing an alternating magnetic field in which the phosphor element is arranged,
wherein the phosphor element has thereon a conductor loop forming a coupling coil that is inductively coupled to the excitation coil such that the coupling coil and the phosphor element can be monitored by way of the inductive coupling.

2. The converter device as claimed in claim 1, configured to capture the inductive coupling of the coupling coil with the excitation coil by way of a phase offset between the voltage and current in the excitation coil.

3. The converter device as claimed in claim 1, configured for an excitation of the excitation coil and for a production of the alternating magnetic field with a frequency of at least 100 MHz and of at most 15 GHz.

4. The converter device as claimed in claim 1, configured for an excitation of the excitation coil and for the production of the alternating magnetic field with a varying frequency.

5. The converter device as claimed in claim 1, wherein the conductor loop of the phosphor element is self-contained.

6. The converter device as claimed in claim 1, wherein the conductor loop is deposited on the phosphor element.

7. The converter device as claimed in claim 1, wherein the conductor loop has a plurality of turns N.

8. The converter device as claimed in claim 1, wherein the conductor loop is provided from indium tin oxide.

9. The converter device as claimed in claim 1, wherein the conductor loop has a fractal shape.

10. The converter device as claimed in claim 1, comprising a conversion radiation optical unit for leading away a conversion radiation beam from the phosphor element, wherein the conductor loop is provided made of a metal and said conductor loop delimits an extent of the conversion radiation beam.

11. The converter device as claimed in claim 1, wherein an excitation coil plane, in which the excitation coil lies, and a coupling coil plane, in which the coupling coil lies, are tilted by at most 30° in relation to one another.

12. The converter device as claimed in claim 1, wherein the excitation coil has an effective cross section that is at most 2 times larger than that of the coupling coil.

13. The converter device as claimed in claim 1, wherein the coupling coil has an inductance of at least 150 pH.

14. The converter device as claimed in claim 1, wherein the conductor loop has an ohmic resistance of at most 20Ω.

15. The converter device as claimed in claim 1, configured to at least reduce a mean output power of the pump radiation source in the case of a fault that is captured by way of the inductive coupling.

16. An irradiation device, comprising a converter device as claimed in claim 1 and a pump radiation source for emitting the pump radiation.

17. A method for producing an irradiation device as claimed in claim 16, wherein the inductive coupling is measured at different known temperature values.

18. The use of an irradiation device as claimed in claim 16 for lighting.

19. The use as claimed in claim 18, wherein the inductive coupling between the excitation coil and the coupling coil is used for heating the coupling coil and the phosphor element.

* * * * *